United States Patent [19]

Yada et al.

[11] Patent Number: 5,783,628
[45] Date of Patent: Jul. 21, 1998

[54] MODIFIED POLYVINYL ALCOHOL

[75] Inventors: Akira Yada, Shiga; Yoshihiro Kawamori, Kyoto; Hiroshi Nishiguchi, Shiga; Akira Kitada, Shiga; Yoshiyuki Mori, Shiga, all of Japan

[73] Assignee: Dai-Ichi Kogyo Seiyaku Co., Ltd., Kyoto, Japan

[21] Appl. No.: 612,434

[22] Filed: Mar. 7, 1996

[51] Int. Cl.$^6$ .................................................. C08F 8/00
[52] U.S. Cl. ............................. 525/59; 524/803; 525/57; 525/60; 525/61
[58] Field of Search ...................... 525/59, 57, 60, 525/61; 524/459, 803, 503, 557; 526/202

[56] References Cited

U.S. PATENT DOCUMENTS

| | | | |
|---|---|---|---|
| 3,505,303 | 4/1970 | Lindemann | 525/56 |
| 3,772,407 | 11/1973 | Williams et al. | 525/59 |
| 3,919,140 | 11/1975 | Hirata et al. | 526/200 |
| 4,670,506 | 6/1987 | Goldenberg et al. | 525/59 |
| 5,104,933 | 4/1992 | Shu | 525/59 |
| 5,155,167 | 10/1992 | Pinschmidt, Jr. et al. | 526/60 |
| 5,237,014 | 8/1993 | Barnabeo | 525/291 |
| 5,340,874 | 8/1994 | Famili et al. | 525/59 |
| 5,350,801 | 9/1994 | Famili et al. | 525/59 |
| 5,416,160 | 5/1995 | Johnson | 525/59 |

FOREIGN PATENT DOCUMENTS

| | | |
|---|---|---|
| 0099631 | 2/1984 | European Pat. Off. . |
| 0632057 | 1/1995 | European Pat. Off. . |
| 1696221 | 12/1971 | Germany . |
| 2199834 | 7/1988 | United Kingdom . |

OTHER PUBLICATIONS

"Vinyl Alcohol Copolymer Aqueous Dispersions Having High Viscosity," *Chemical Abstracts*, vol. 97, No. 14, Oct. 1982, p.14, column 1.

"Water-Repellent Copolymers," *Chemical Abstracts*, vol. 96, No. 18, May 1982, pp. 48–49 column 2.

Ito et al, Kyogo Kagaku Zasshi, 63(2), 1960, pp. 142–145.

Mitsuru Kondo et al, "Studies on Proposed Papers (III). Flow Properties of Coating Colors Containing Acrylamide–modified Polyvinyl Alcohol", Japan Tappi Journal, 1971, pp. 23–29.

*Primary Examiner*—Judy M. Reddick
*Attorney, Agent, or Firm*—Sughrue, Mion, Zinn, Macpeak & Seas

[57] ABSTRACT

A modified polyvinyl alcohol is disclosed, which comprises the following structural units (I) and (II) and has a weight average molecular weight of from 3,000 to 400,000:

$$-(CH_2-CH)- \atop {|\atop O-CH_2-CHR^1-COOM^1}} \quad (I)$$

$$-(CH_2-CH)- \atop {|\atop OH}} \quad (II)$$

wherein $R^1$ represents H or $CH_3$; and $M^1$ represents H, an alkali metal, ammonium, alkylammonium, or alkanolammonium. The modified polyvinyl alcohol may be sulfonated. The modified polyvinyl alcohol is used as a dispersant such as a drilling fluid additive.

13 Claims, 8 Drawing Sheets

MODIFIED POLYVINYL ALCOHOL

FIELD OF THE INVENTION

The present invention relates to a water-soluble modified polyvinyl alcohol. More particularly, the present invention relates to a carboxyalkylated polyvinyl alcohol and a carboxyalkylated and sulfonated polyvinyl alcohol.

BACKGROUND OF THE INVENTION

The modified polyvinyl alcohols of the present invention are excellent as dispersants for various kinds of powdery solid materials and thus useful as thinners and fluid control agents for aqueous drilling fluids. It is also applicable to various industrial fields' chemicals such as additives for paper-manufacturing, chemicals for textile industry, slurry conditioners for excavation in civil engineering and construction works, water soluble films in addition to uses of the conventional polyvinyl alcohols (PVA).

It is known that PVA may be modified by various chemical means such as esterification and grafting. Modification of PVA with acrylamide was reported by H. Ito (*Kogyo Kagaku Zasshi*, 63(2):142-145 (1960)); M. Kondo et al. (*JAPAN TAPPI JOURNAL*, 25(11):23-29 (1971)), and other people. In the former reference, described are the reaction of PVA with acrylamide, and a modified polyvinyl alcohol containing 35.7 mol % of carbamoylethyl groups and 2.2 mol% carboxyethyl groups obtained by reacting PVA with acrylamide (AM) and hydrolyzing it. On the other hand, in the latter reference, described is modified polyvinyl alcohols containing 0.6 to 5.3 mol % of carbamoylethyl groups and 0.6 to 12.5 mol % of carboxyethyl groups.

However, none of these publicly known references indicates the modified polyvinyl alcohols containing only carboxyethyl groups without a carbamoylethyl group and the use of such modified polyvinyl alcohols as dispersants and drilling fluid additives. In addition, these modified polyvinyl alcohols fail to exert such an excellent dispersing performance as being usable in practice.

Examples of chemicals which have been employed in drilling fluids (used in the drilling of wells in the earth, for example, which are drilled for the purpose of tapping subterranean deposits of petroleum, gas and other fluid materials (including geothermal)) and clayey slurries for excavation in civil engineering and construction works include carboxymethyl cellulose (CMC), starch and derivatives thereof, sodium polyacrylate, partial hydrolyzed polyacrylamide, and alkali metal salts of copolymers of maleic anhydride (e.g., copolymers of maleic anhydride with styrene).

Since these chemicals contain carboxyl groups at some sites of polymer chains in a pendent state which are anionically charged in water, they are adsorbed onto the surface of clay particles employed as a thickener in drilling fluids and thus the clay particles are anionically charged. As a result, the clay particles are dispersed due to the electrical repulsion among them.

However, these conventional chemicals are poor in salt and heat resistance. When the formation temperature is elevated and the formation water rich in salts (in particular, divalent metal ions) contaminates drilling fluids as the drilling proceeds deeply, therefore, conventional chemicals are chemically deteriorated and suffer from a decrease in viscosity due to reactions between the divalent metal ions and the carboxyl groups. Thus, the fluid loss reducing performance, which is an important function as a drilling fluid additive, is worsened.

Among the drilling fluid additive commonly employed in the art, for example, starch is quickly deteriorated at about 100° to 120° C., and CMC and synthetic polymers are evidently deteriorated at 160° C. Moreover, divalent metal ions bind to carboxyl groups of polymers and thus cause the viscosity of the polymer to decrease. Therefore, the deterioration becomes further evident in a salt water system containing much divalent metal ions.

SUMMARY OF THE INVENTION

An object of the present invention is to provide novel water-soluble polymer compounds, which are excellent as dispersants for various kinds of solid particles and resistant against divalent metal ions and thus exhibits excellent fluid loss reducing performance on drilling fluids.

Another object of the present invention is to provide dispersants for various kinds of powdery solid particles (in particular, dispersants for inorganic materials or powdery biocides).

To solve the above-mentioned problems, the present inventors have found that carboxyalkylated polyvinyl alcohols (i.e., modified polyvinyl alcohols), which are obtained by hydrolyzing acrylamide or methacrylamide adducts of PVA, serve as dispersants or drilling fluids additives, thus completing the present invention.

Furthermore, to solve the above-mentioned problems, the present inventors have found that carboxyalkylated and sulfonated modified polyvinyl alcohols, which are obtained by hydrolyzing modified acrylamide or methacrylamide adducts of PVA and reacting with 2-acrylamide-2-methylpropane-3-sulfonate by the Michael reaction as described below, serve as drilling fluid additives, thus completing the present invention.

Thus, these and other objects of the present invention have been attained by a modified polyvinyl alcohol, which comprises the following structural units (I) and (II) and has a weight average molecular weight of from 3,000 to 400,000:

$$-(CH_2-CH)- \quad (I)$$
$$\quad | \quad$$
$$O-CH_2-CHR^1-COOM^1$$

$$-(CH_2-CH)- \quad (II)$$
$$\quad | \quad$$
$$OH$$

wherein $R^1$ represents H or $CH_3$; and $M^1$ represents H, an alkali metal, ammonium, alkylammonium, or alkanolammonium.

BRIEF DESCRIPTION ON THE INVENTION

DETAILED DESCRIPTION OF THE INVENTION

Figure 1:
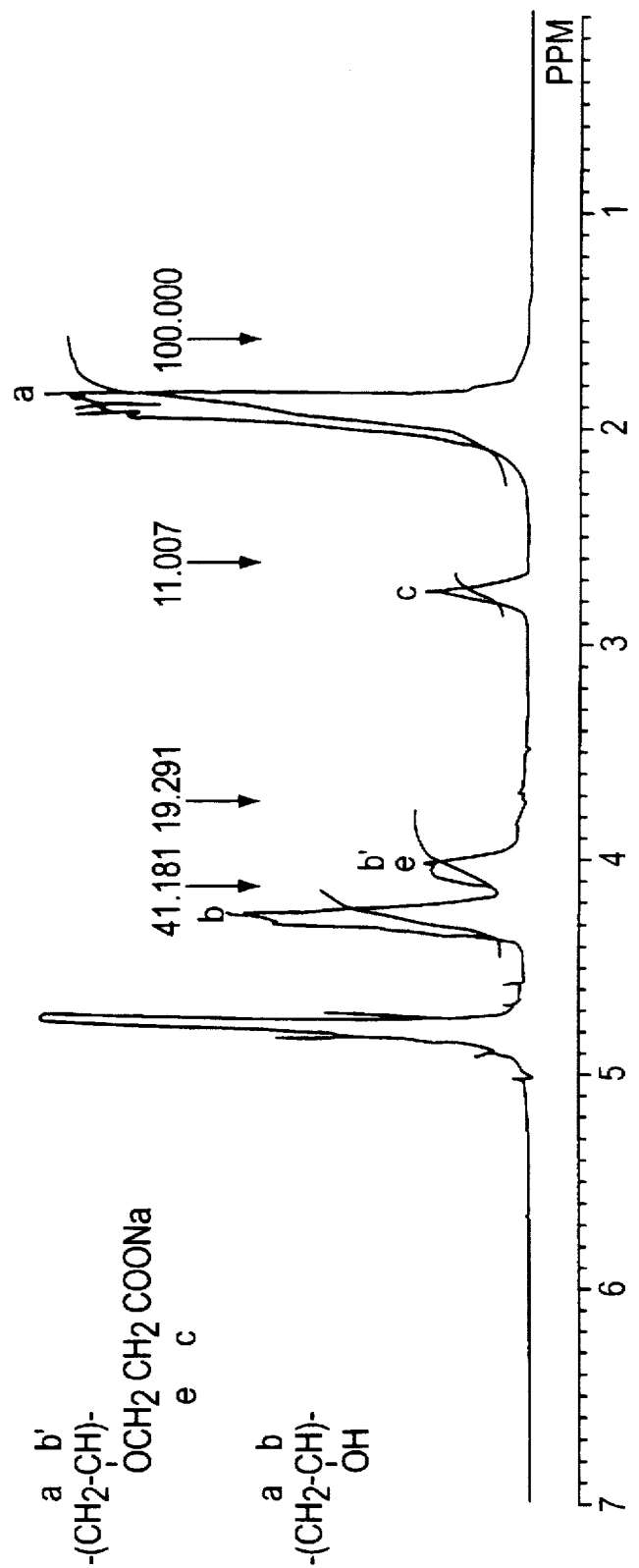
FIG. 1 shows the NMR spectrum of a modified polyvinyl alcohol obtained in Example 2.
Figure 2:
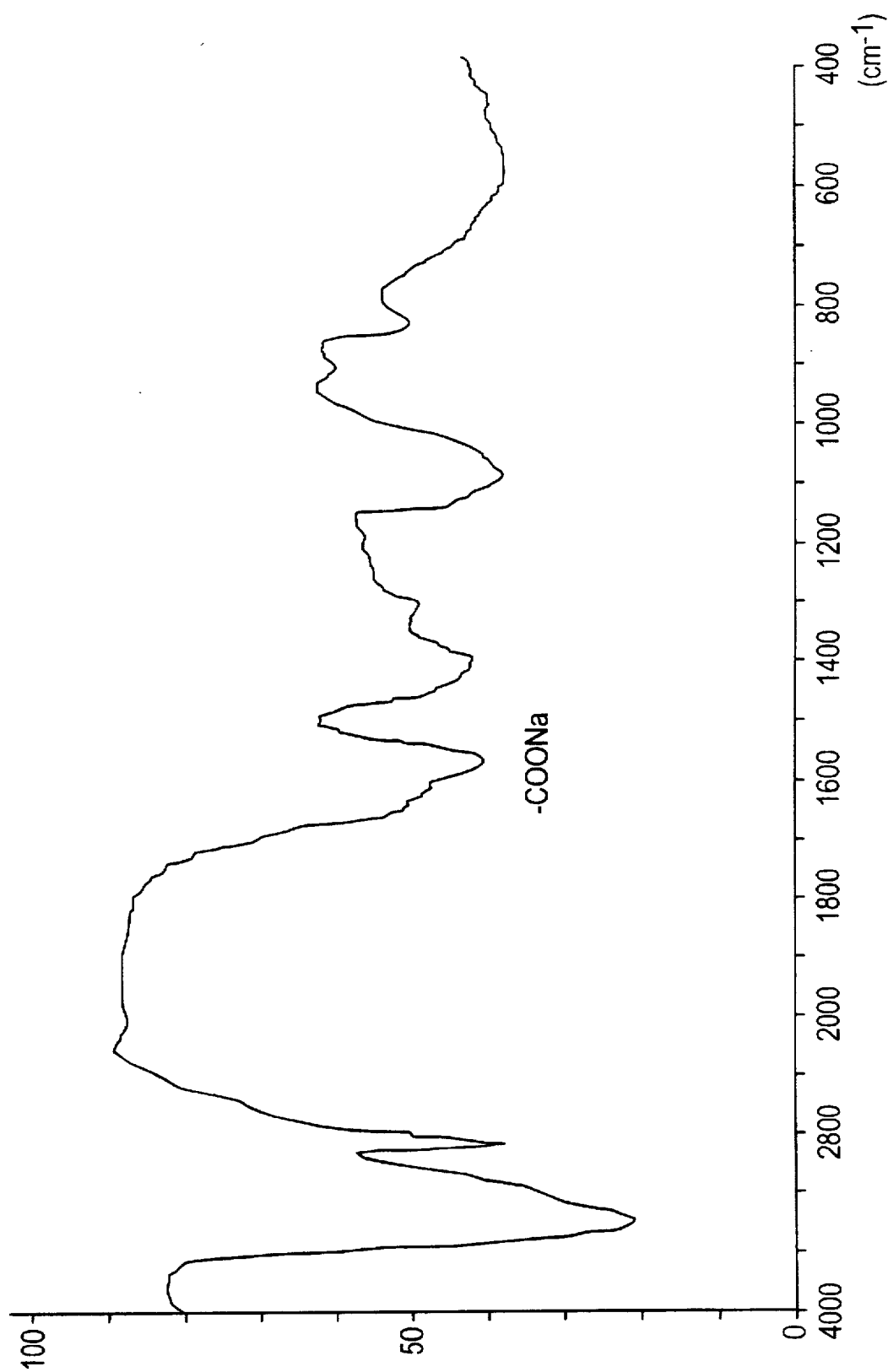
FIG. 2 shows the IR spectrum of a modified polyvinyl alcohol obtained in Example 2.

The modified polyvinyl alcohol comprising the structural units (I) and (II) may further contain the following structural unit (III):

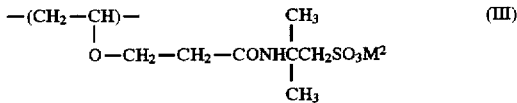

wherein $M^2$ represents H, an alkali metal, ammonium, alkylammonium, or alkanolammonium.

Examples of the alkali metal represented by $M^1$ and $M^2$ in the structural units (I) and (III) include Na, K and Li. Examples of the alkylammonium represented by $M^1$ and $M^2$ include monomethylammonium, dimethylammonium and trimethylammonium. Examples of the alkanolammonium represented by $M^1$ and $M^2$ include monoethanolammonium, diethanolammonium and triethanolammonium.

Furthermore, the modified polyvinyl alcohol comprising the structural units (I) and (II) may further contain the following structural unit (IV):

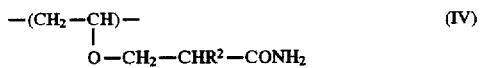

wherein $R^2$ represents H or $CH_3$.

Moreover, the modified polyvinyl alcohol comprising the structural units (I) and (II) may further contain the structural units (III) and (IV) at the same time.

When the modified polyvinyl alcohol comprises the structural units (I) and (II), it is preferred that the structural unit (I) is contained in an amount of from 3.0 to 45.0 mol %; and the structural unit (II) is contained in an amount of from 55.0 to 97.0 mol %.

When the modified polyvinyl alcohol comprises the structural units (I), (II) and (III), it is preferred that the structural unit (I) is contained in an amount of from 0.5 to 30.0 mol %; the structural unit (II) is contained in an amount of from 50.0 to 99.4 mol %; the structural unit (III) is contained in an amount of from 0.1 to 20.0 mol %; and the total amount of the structural units (I) and (III) is from 0.6 to 50.0 mol %.

When the modified polyvinyl alcohol comprises the structural units (I), (II) and (IV), it is preferred that the structural unit (I) is contained in an amount of from 3.0 to 45.0 mol %; the structural unit (II) is contained in an amount of from 55.0 to 97.0 mol %; and the structural unit (IV) is contained in an amount of 10.0 mol % or less.

When the modified polyvinyl alcohol comprises the structural units (I), (II), (III) and (IV), it is preferred that the structural unit (I) is contained in an amount of from 0.5 to 30.0 mol %; the structural unit (II) is contained in an amount of from 50.0 to 99.4 mol %; the structural unit (III) is contained in an amount of from 0.1 to 20.0 mol %; the structural unit (IV) is contained in an amount of 5.0 mol % or less; and the total amount of the structural units (I) and (III) is from 0.6 to 50.0 mol %.

The modified polyvinyl alcohols of the present invention can be used as dispersants such as drilling fluid (or mud) additives and slurry-conditioner for excavation (herein often referred to as "drilling fluid additives"). When the modified polyvinyl alcohols of the present invention are used as dispersants, the weight average molecular weight thereof is preferably from 3,000 to 300,000.

When the modified polyvinyl alcohol of the present invention comprises the structural units (I) and (II), or (I), (II) and (IV), the ratio (content amount) of the structural unit (I) is from 3.0 to 45.0 mol %, preferably from 15.0 to 40.0 mol %. If the ratio thereof is less than 3.0 mol %, the obtained polymer has insufficient anionic property and dispersing performance, and is easy to aggregate solid material particles. If the ratio exceeds 45.0 mol %, the preparation thereof is difficult.

All or main part of the modified polyvinyl alcohol excluding the structural units (I) and (III) is basically the structural unit (II).

The structural unit (IV) may be contained in the modified polyvinyl alcohols of the present invention for manufactural reasons. There is no problem if the ratio thereof is 10.0 mol % or less, preferably 5.0 mol % or less.

Also, in addition to the structural units (I), (II), (III) and (IV), the following structural unit (V) may be contained for manufactural reasons; however, the structural unit (V) has no influence on the properties of the obtained modified polyvinyl alcohol of the present invention. The amount of the structural unit (V) is preferably 3.0 mol % or less.

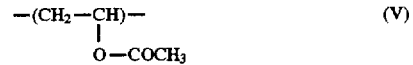

Moreover, it is difficult to prepare the modified polyvinyl alcohol having a weight average molecular weight less than 3,000, or more than 400,000.

The viscosity (rheology) of the modified polyvinyl alcohols of the present invention in a 4% NaCl aqueous solution (polymer concentration: 4% by weight) is 3 to 50 mPa·s, when determined using a rotor No. 1 of a Brookfield type viscometer (rotary viscometer: B-type viscometer manufactured by Tokyokeiki Ltd.) at 60 rpm at 25° C.

The modified polyvinyl alcohol comprising the structural units (I) and (II) of the present invention can be obtained by, for example, reacting acrylamide or methacrylamide with the polyvinyl alcohol by the Michael addition reaction in the presence of an alkali followed by hydrolysis, as shown in the following reaction scheme. It is preferable to use acrylamide from the viewpoint of reactivity.

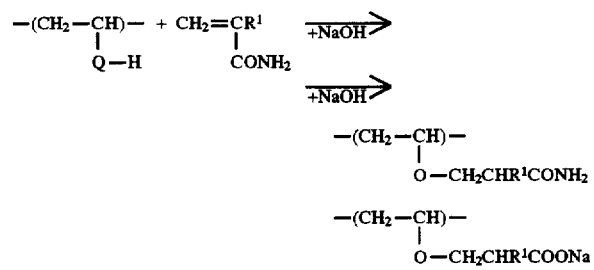

The modified polyvinyl alcohol comprising the structural units (I) and (II) of the present invention may be identified by determining the existence of carbamoylethyl group and carboxyethyl group and the molar fractions thereof using IR (infrared) or NMR (nuclear magnetic resonance) spectrometry. Now, the identification thereof will be described as an example by taking the analytical data of the modified polyvinyl alcohol obtained in Example 3 described below.

Figure 3:
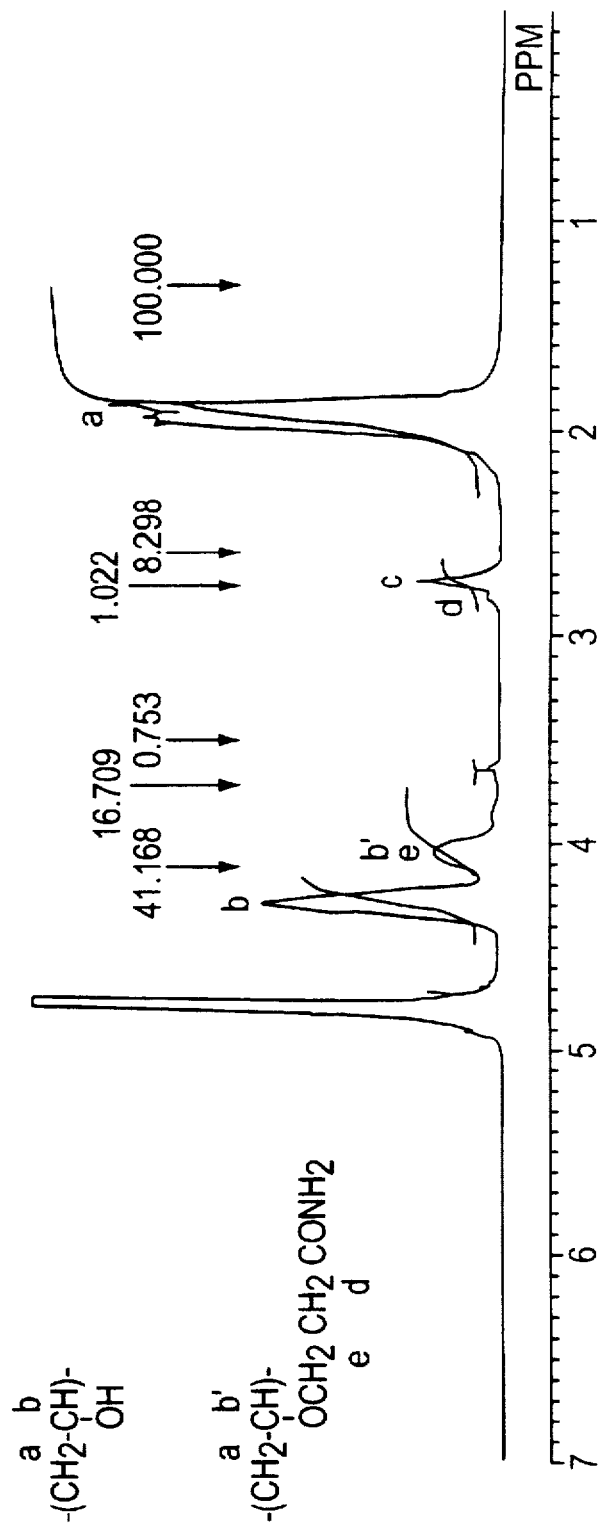
FIG. 3 shows the NMR spectrum of a modified polyvinyl alcohol obtained in Example 3.

FIG. 3 shows the $^1$H-NMR spectrogram. The peak at 2.7 ppm is assigned to a proton bonded to a carbon atom to which a carboxyl group is bonded, and the peak at 2.8 ppm is assigned to a proton bonded to a carbon atom to which an amide group is bonded. The modification ratio of the polyvinyl alcohol is determined based on the comparison with the proton peaks of polyvinyl alcohol. The contents of carboxyethyl and carbamoylethyl groups of this modified polyvinyl alcohol are 8.3 mol % and 1.0 mol %, respectively.

Figure 4:
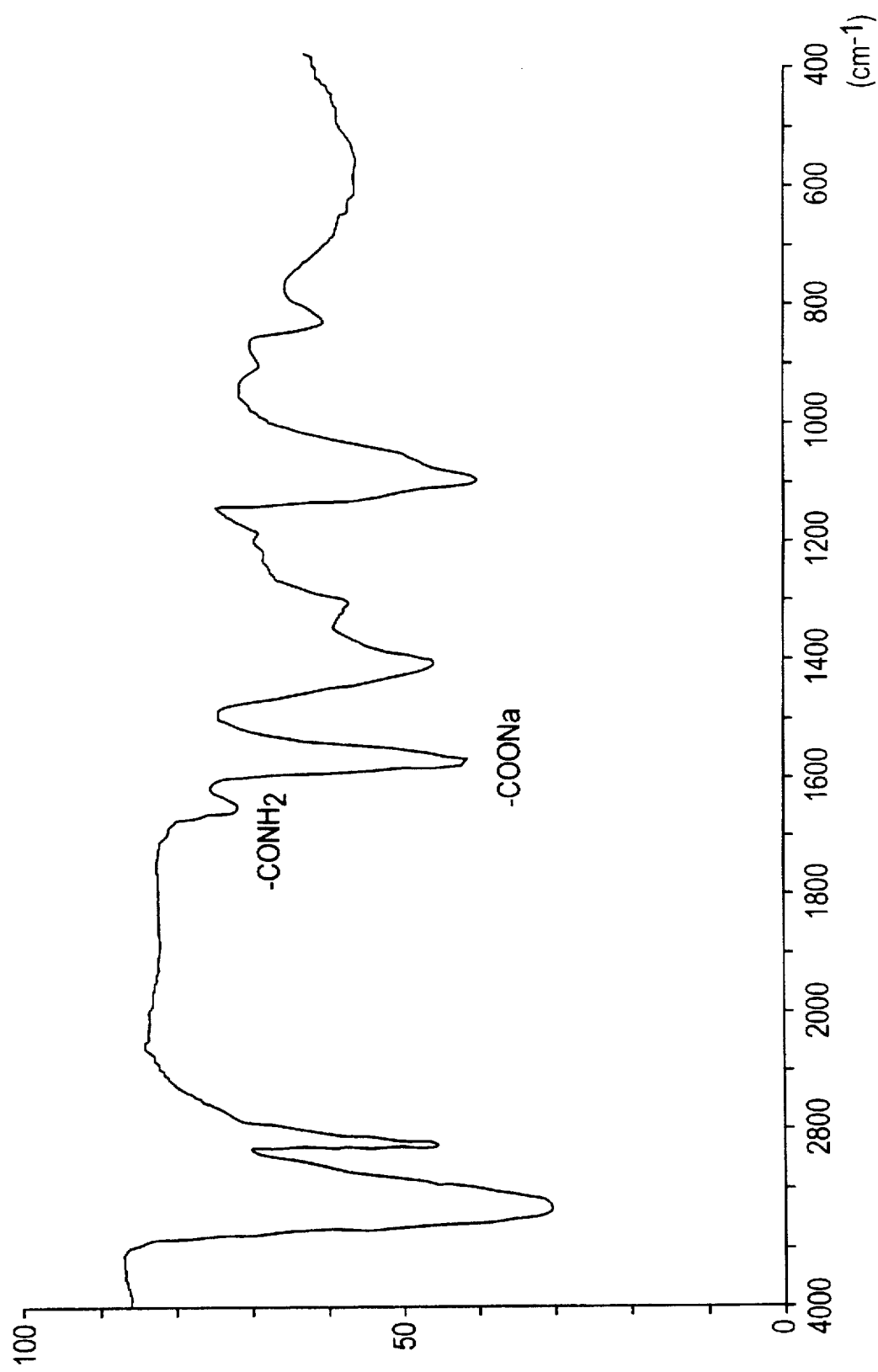
FIG. 4 shows the IR spectrum of a modified polyvinyl alcohol obtained in Example 3.

FIG. 4 shows the IR spectrogram. An absorption of an amide group in a carbamoylethyl group and that of a carboxyl group are observed at 1,670 cm$^{-1}$ and 1,570 cm$^{-1}$, respectively.

Based on the nitrogen content (%) determined by the semimicro-Kjeldahl method and the carboxyl group content (mol/g) determined by the colloidal titration method, the carbamoylethylated degree (CB degree) and the carboxyethylated degree (CO degree) can be calculated in accordance with the following formulae.

$$CB\ degree\ (mol\ \%) = \frac{44 \times 100 \times N}{1400 - 71 \times N - 1400 \times 72 \times C}$$

$$CO\ degree\ (mol\ \%) = \frac{1400 \times 44 \times 100 \times C}{1400 - 71 \times N - 1400 \times 72 \times C}$$

The modified polyvinyl alcohol obtained in Example 3 contains 0.29% of nitrogen and $1.61 \times 10^{-3}$ mol/g of carboxyl group. Thus, the CB degree and CO degree thereof are 1.0 mol % and 8.1 mol %, respectively.

As described above, the results of the NMR method are almost similar to the results of the calculation on the basis of the data obtained by the semimicro-Kjeldahl method and the colloidal titration method. Accordingly, it is concluded that the reaction ratio may be determined by any of these methods.

Furthermore, the modified polyvinyl alcohol comprising the structural units (I), (II) and (III) of the present invention may be obtained by, for example, the following methods.

(1) Acrylamide or methacrylamide is allowed to react with a polyvinyl alcohol by the Michael addition reaction in the presence of an alkali catalyst. After hydrolyzing it, 2-acrylamide-2-methylpropane-3-sulfonate (AMPS) is further allowed to react therewith by the Michael addition reaction.

(2) Acrylamide or methacrylamide and AMPS are allowed to react with a polyvinyl alcohol by the Michael addition reaction followed by hydrolysis.

(3) AMPS is allowed to react with polyvinyl alcohol by the Michael addition reaction in the presence of an alkali catalyst. Then, acrylamide or methacrylamide is further allowed to react therewith by the Michael addition reaction followed by hydrolysis.

In the above reactions, acrylamide is preferable to methacrylamide from the viewpoint of reactivity.

Examples of the AMPS include sodium 2-acrylamide-2-methylpropane-3-sulfonate (AMPS-Na) and potassium 2-acrylamide-2-methylpropane-3-sulfonate (AMPS-K). After reacting with the AMPS-Na or AMPS-K, furthermore, the pH value may be adjusted to a neutral or acidic level by adding a mineral acid, and then ammonia, alkylamine or alkanolamine is added. Thus, $M^1$ and $M^2$ in the structural unit (I) and (III) are converted into ammonium, alkylammonium or alkanolammonium.

The modified polyvinyl alcohol comprising the structural units (I), (II) and (III) of the present invention is identified and quantitatively analyzed using IR spectrometry, NMR spectrometry, the determination of anion equivalent (sulfonate group content) at pH 3 and the determination of anion equivalent (sulfonate group and carboxyl group contents) at pH 10 by the colloidal titration method, and the determination of nitrogen content by the semimicro-Kjeldahl method. The colloidal titration method, which is commonly employed in the determination of the anion equivalent of a polymer, comprises adding 2-methylglycol chitosan to an aqueous solution of the polymer and, after the completion of the addition, titrating with an aqueous solution of polyvinyl alcohol potassium sulfate.

In the modified polyvinyl alcohols of the present invention, the degree of polymerization of the based polyvinyl alcohol is from 50 to 10,000, preferably from 200 to 3,500. Most of the remaining acetate residues in the polyvinyl alcohol, if any, are finally saponified because the hydrolysis is carried out in the presence of an alkali. Accordingly, the degree of saponification thereof is not particularly restricted, it is preferable to use a product saponified at an extent of from 70 to 100%. More preferably, a completely saponified product is used so as to cut down the consumption of the alkali.

Examples of the alkali to be used as a catalyst in the Michael addition reaction include KOH, NaOH and triethylamine.

The Michael addition reaction may be performed in the following manner. A 1 to 50% by weight solution of polyvinyl alcohol is prepared using a solvent such as lower alcohol having 1 to 4 carbon atoms (e.g., methanol, isopropyl alcohol), water, dimethyl sulfoxide or dimethylformamide. Based on the hydroxyl group of the polyvinyl alcohol, 0.5 to 20 mol % of an alkali and 10 to 200 mol % of acrylamide or methacrylamide, and, if needed, 10 to 200 mol % of an AMPS polymer are added thereto. Moreover, a small amount of a polymerization inhibitor (for example, hydroquinone, hydroquinone monomethyl ether) may be added thereto, if needed. Then, the obtained mixture is allowed to react at a temperature of from 20° to 80° C. for 10 minutes to 20 hours. If the AMPS is added, the order of the Michael addition reaction of the acrylamide (or methacrylamide) and the AMPS is not particularly limited. They may be allowed to react in this order, in the reverse order, or at the same time.

In the Michael addition reaction, the reaction amount of the acrylamide or methacrylamide per 100 mol % of the polyvinyl alcohol is preferably from 3 to 45 mol %, though it may be arbitrarily controlled by selecting appropriate reaction conditions. When the ratio of the acrylamide or methacrylamide adduct is less than 3 mol %, sufficiently anionic properties cannot be achieved within a common working range. When it exceeds 45 mol %, on the other hand, the addition reaction can hardly proceed. In this case, further, higher anionic contents are not effective any more.

It is possible to obtain products in various forms. It is easy to produce powdery products, for example, by controlling the concentration of the reaction mixture as high as possible to thereby facilitate drying.

The acrylamide group or methacrylamide group (carbamoylethyl group) which is allowed to react with the polyvinyl alcohol is hydrolyzed to a carboxyethyl group by alkali at 50 to 90° C. for 1 to 6 hours.

Examples of the alkali include NaOH, KOH, LiOH, $Na_2CO_3$, $NH_4OH$, alkylamines (e.g., monomethylamine, dimethylamine, trimethylamine), and alkanolamines (e.g., monoethanolamine, diethanolamine, triethanolamine). For example, when an alkylamine is employed therefor, $M^1$ and $M^2$ in the structural units (I) and (III) become an alkylammonium. When an alkanolamine is employed therefor, $M^1$ and $M^2$ in the structural units (I) and (III) become an alkanolammonium.

After the completion of the hydrolysis, the reaction product can be recovered via precipitation by adding a solvent such as acetone and lower alcohol (e.g., methanol, ethanol, n-propanol, isopropyl alcohol) in an excessive amount.

In the modified polyvinyl alcohol comprising the structural units (I), (II) and (III) of the present invention, the content of the carboxyethyl group is from 0.5 to 30.0 mol %, the content of the AMPS which is allowed to react is from 0.1 to 20.0 mol %, and the total content thereof is from 0.6 to 50.0 mol %. When the content of these anionic groups which are allowed to react is less than 0.6 mol %, the anionic properties are insufficient and thus only a poor dispersing effect is achieved. It is difficult to produce polymers containing more than 50.0 mol % anionic content. A smaller content of the AMPS adduct group causes a insufficient salt resistance of the polymer.

The modified polyvinyl alcohols of the present invention can be appropriately employed as dispersants (in particular, dispersants for inorganic materials and powdery insecticides), slurry-conditioners for excavation (engineering excavation work) and drilling fluid (mud) additives for petroleum, gas, geothermal drilling.

The drilling mud additive of the present invention is employed in an amount of from 0.01 to 5% by weight, preferably from 0.1 to 4% by weight, based on the amount of the drilling mud. To obtain drilling mud by using polymers of the present invention, the drilling mud may be prepared in accordance with the conventional manner. For example, 2 to 10% of a clay commonly employed in the art (for example, bentonite, attapulgite) is dispersed in fresh water or salt water. Then, the polymer is added and a homogeneous dispersion is prepared using a dispersion stirrer such as a homodisper.

If necessary, the pH value of the mud is adjusted with an aqueous solution of an alkali (for example, sodium hydroxide).

The polymers (modified polyvinyl alcohols) of the present invention may be used together with other conventional chemicals (for example, sodium hexametaphosphate, sodium tripolyphosphate, sodium ligninsulfonate, carboxymethyl cellulose, sodium alginate).

When employed as a drilling mud additive, the modified polyvinyl alcohols of the present invention show good salt and heat resistance and excellent dispersing performance and fluid loss reducing performance. The function mechanism thereof is considered as follows.

(1) A highly anionic polymer with a low molecular weight having a carboxyl group (for example, sodium polyacrylate) is effective as a dispersant for drilling mud. The carboxyl group of such a polymer is anionically charged in water and thus adsorbed onto the surface of a clay particle charged cationically. Thus, the surface of the clay particle is anionically charged. As a result, the electrical mutual repulsion among the anionically charged clay particles causes the dispersion of the clay particles. By using the modified polyvinyl alcohol of the present invention, clay particles can be dispersed in the same manner.

(2) When mud, in which clay particles are dispersed by using a polymer having a carboxyl group conventionally employed in the art, is contaminated with divalent metal ions, the divalent metal ions are bonded to the carboxyl group of the polymer and thus lower the water-solubility of the polymer. As a result, the dispersing performance and the fluid loss reducing performance of the polymer are worsened. In contrast, the modified polyvinyl alcohol of the present invention has a hydroxyl group which does not react with divalent metal ions in addition to the carboxyl group. Thus, it can sustain both of the water-solubility and the dispersing and fluid loss reducing performances. This advantage is maintained even at a high temperature.

The present invention is now illustrated in detail by way of the following examples, but it should be understood that the present invention is not to be construed as being limited thereto. All percents, parts and ratios are by weight unless otherwise indicated.

EXAMPLES

Example 1

Into a 4 l horizontal blender were added 300 g of powdery polyvinyl alcohol (PVA-117 manufactured by Kuraray Co., Ltd., degree of saponification: 95% or more, degree of polymerization: 1,700), 750 g of 100% isopropyl alcohol and 85 g of a 50% NaOH aqueous solution, and the mixture was homogenized with stirring at 25° C. for 2 hours. Next, 600 g of a 50% acrylamide aqueous solution was added thereto, and the mixture was allowed to react with stirring at 25° C. for 2 hours. After the completion of the reaction, 260 g of a 50% NaOH aqueous solution was added thereto, and the mixture was hydrolyzed by heating to 70° C. for 2 hours. After adding isopropyl alcohol in a 5-fold amount, a polymer was purified, dehydrated and dried at 105° C.

The polymer thus obtained was analyzed using NMR and IR. The carboxyethyl group content and the carbamoylethyl group content thereof were 20.5 mol % and 0.0 mol %, respectively. In the NMR analysis, the measurement was carried out in a heavy water solution by using an instrument (manufactured by JEOL Ltd.) of 270 MHz in the main frequency. In the IR analysis, a 0.2% polymer aqueous solution was dried at 105° C. to give a film which was then subjected to the measurement.

The nitrogen content determined by the semimicro-Kjeldahl method was 0.0%, and the carboxyl group content (C) determined by the colloidal titration method was $3.30 \times 10^{-3}$ mol/g. Based on these data, the carbamoylethylated degree (CB degree) and the carboxyethylated degree (CO degree) were calculated as 0.0 mol % and 19.0 mol %, respectively.

The weight-average molecular weight of the polymer measured using gel permeation chromatography (GPC) was 130,000. The measurement was carried out at 40° C. using a 0.1N NaCl aqueous solution as an eluent and 4 columns (TSK gel G2500PW, G3000PW, G4000PW, G5000PW; manufactured by Tosoh Corporation) connected in a series. RI was employed for the detection. A calibration curve was formed using PEG-PEOs as molecular weight standards.

The 4% NaCl aqueous solution containing the polymer at a concentration of 4% by weight had a viscosity of 15.0 mPa·s. The viscosity was measured using a rotor No. 1 of a Brookfield type viscometer at 60 rpm at 25° C.

Examples 2

Into a 4 l horizontal blender were added 400 g of powdery polyvinyl alcohol (PVA-117 manufactured by Kuraray Co., Ltd., degree of saponification: 95% or more, degree of polymerization: 1,700), 50 g of a 50% NaOH aqueous solution and 1,200 g of isopropyl alcohol, and the mixture was homogenized with stirring for 2 hours. Next, 350 g of a 50% acrylamide aqueous solution was added thereto, and the mixture was stirred by heating to 40° C. for 2 hours. Then, 160 g of a 50% NaOH aqueous solution was added thereto, and the mixture was stirred by heating to 70° C. for 2 hours. After cooling the mixture, a polymer was precipitated with isopropyl alcohol, isolated and dried.

When the polymer thus obtained was analyzed using NMR (see FIG. 1), the carboxyethyl group content and the carbamoylethyl group content thereof were 11.0 mol % and 0.0 mol %, respectively. The IR spectrum is shown in FIG.

2. The weight-average molecular weight of the polymer measured using GPC was 140,000. The 4% NaCl aqueous solution containing the polymer at a concentration of 4% by weight had a viscosity of 17.0 mP·s.

Example 3

Into a 4 l horizontal blender were added 300 g of powdery polyvinyl alcohol (PVA-117 manufactured by Kuraray Co., Ltd., degree of saponification: 95% or more, degree of polymerization: 1,700), 50 g of a 50% NaOH aqueous solution and 1,200 g of isopropyl alcohol, and the mixture was homogenized with stirring for 2 hours. Next, 350 g of a 50% acrylamide aqueous solution was added thereto, and the mixture was stirred by heating to 40° C. for 2 hours. Then, 140 g of a 50% NaOH aqueous solution was added thereto, and the mixture was stirred by heating to 70° C. for 2 hours. After drying the mixture, a polymer was precipitated with isopropyl alcohol, isolated and dried.

When the polymer thus obtained was analyzed using NMR (see FIG. 3), the carboxyethyl group content and the carbamoylethyl group content thereof were 8.3 mol % and 1.0 mol %, respectively. The IR spectrum is shown in FIG. 4.

The nitrogen content determined by the semimicro-Kjeldahl method was 0.29%, and the carboxyl group content determined by the colloidal titration method was $1.61 \times 10^{-3}$ mol/g. Based on these data, the carbamoylethylated degree (CB degree) and the carboxyethylated degree (CO degree) were calculated as 1.0 mol % and 8.1 mol %, respectively.

The weight-average molecular weight of the polymer measured using GPC was 125,000. The 4% NaCl aqueous solution of containing the polymer at a concentration of 4% by weight had a viscosity of 14.0 mPa·s.

Example 4

Into a 4 l horizontal blender were added 400 g of powdery polyvinyl alcohol (PVA-117 manufactured by Kuraray Co., Ltd., degree of saponification: 95% or more, degree of polymerization: 1,700), 70 g of a 50% KOH aqueous solution and 500 g of isopropyl alcohol, and the mixture was homogenized with stirring for 2 hours. Next, 1,290 g of a 50% acrylamide aqueous solution was added thereto, and the mixture was stirred by heating to 40° C. for 2 hours. Then, 954 g of a 50% KOH aqueous solution was added thereto, and the mixture was stirred by heating to 70° C. for 2 hours. After cooling the mixture, a polymer was precipitated with isopropyl alcohol, isolated and dried.

When the polymer thus obtained was analyzed using NMR, the carboxyethyl group content and the carbamoylethyl group content thereof were 32.5 mol % and 1.2 mol %, respectively. The weight-average molecular weight of the polymer measured using GPC was 140,000. The 4% NaCl aqueous solution containing the polymer at a concentration of 4% by weight had a viscosity of 16.0 mPa·s.

Example 5

Into a 4 l horizontal blender were added 400 g of powdery polyvinyl alcohol (PVA-105 manufactured by Kuraray Co., Ltd., degree of saponification: 95% or more, degree of polymerization: 500), 50 g of a 50% NaOH aqueous solution and 1,200 g of isopropyl alcohol, and the mixture was homogenized with stirring for 2 hours. Next, 350 g of a 50% acrylamide aqueous solution was added thereto, and the mixture was stirred by heating to 40° C. for 2 hours. Then, 150 g of a 50% NaOH aqueous solution was added thereto, and the mixture was stirred by heating to 70° C. for 2 hours. After cooling the mixture, a polymer was precipitated with isopropyl alcohol, isolated and dried.

When the polymer thus obtained was analyzed using NMR, the carboxyethyl group content and the carbamoylethyl group content thereof were 9.5 mol % and 1.2 mol %, respectively. The weight-average molecular weight of the polymer measured using GPC was 40,000. The 4% NaCl aqueous solution containing the polymer at a concentration of 4% by weight had a viscosity of 5.0 mPa·s.

Example 6

Into a 4 l horizontal blender were added 400 g of powdery polyvinyl alcohol (PVA-124 manufactured by Kuraray Co., Ltd., degree of saponification: 95% or more, degree of polymerization: 2,400), 50 g of a 50% NaOH aqueous solution and 1,200 g of isopropyl alcohol, and the mixture was homogenized with stirring for 2 hours. Next, 350 g of a 50% acrylamide aqueous solution was added thereto, and the mixture was stirred by heating to 40° C. for 2 hours. Then, 150 g of a 50% NaOH aqueous solution was added thereto, and the mixture was stirred by heating to 70° C. for 2 hours. After cooling the mixture, a polymer was precipitated with isopropyl alcohol, isolated and dried.

When the polymer thus obtained was analyzed using NMR, the carboxyethyl group content and the carbamoylethyl group content thereof were 7.5 mol % and 0.2 mol %, respectively. The weight-average molecular weight of the polymer measured using GPC was 210,000. The 4% NaCl aqueous solution containing the polymer at a concentration of 4% by weight had a viscosity of 25.0 mPa·s.

Example 7

Into a 4 l horizontal blender were added 400 g of powdery polyvinyl alcohol (degree of saponification: about 88%, degree of polymerization: 300), 60 g of a 50% NaOH aqueous solution and 500 g of water, and the mixture was stirred for 2 hours. Next, 1,300 g of a 50% acrylamide aqueous solution was added thereto, and the mixture was stirred by heating to 40° C. for 2 hours. Then, 680 g of a 50% NAOH aqueous solution was added thereto, and the mixture was stirred by heating to 70° C. for 2 hours. After cooling the mixture, a polymer was purified with methanol, dried and powdered.

When the polymer thus obtained was analyzed using NMR, the carboxyethyl group content and the carbamoylethyl group content thereof were 28.0 mol % and 1.0 mol %, respectively. The weight-average molecular weight of the polymer measured using GPC was 15,000.

Comparative Example 1

Into a 4 l horizontal blender were added 400 g of powdery polyvinyl alcohol (PVA-117 manufactured by Kuraray Co., Ltd., degree of saponification: 95% or more, degree of polymerization: 1,700), 20 g of a 50% NaOH aqueous solution and 1,200 g of isopropyl alcohol, and the mixture was homogenized with stirring for 2 hours. Next, 77 g of a 50% acrylamide aqueous solution was added thereto, and the mixture was stirred by heating to 40° C. for 2 hours. Then, 23 g of a 50% NaOH aqueous solution was added thereto, and the mixture was stirred by heating to 70° C. for 2 hours. After cooling the mixture, a polymer was precipitated with isopropyl alcohol, isolated and dried.

When the polymer thus obtained was analyzed using NMR, the carboxyethyl group content and the carbamoylethyl group content thereof were 2.6 mol % and 0.1 mol %, respectively. The weight-average molecular weight of the polymer measured using GPC was 110,000. The 4% NaCl aqueous solution containing the polymer at a concentration of 4% by weight had a viscosity of 12.0 mPa·s.

Comparative Example 2

Into a 4 l horizontal blender were added 400 g of powdery polyvinyl alcohol (PVA-117 manufactured by Kuraray Co., Ltd., degree of saponification: 95% or more, degree of polymerization: 1,700), 50 g of a 50% NaOH aqueous solution and 1,200 g of isopropyl alcohol, and the mixture was homogenized with stirring for 2 hours. Next, 350 g of a 50% acrylamide aqueous solution was added thereto, and the mixture was allowed to react with stirring. Then, the polymer was precipitated with isopropyl alcohol, isolated and dried.

Figure 5:
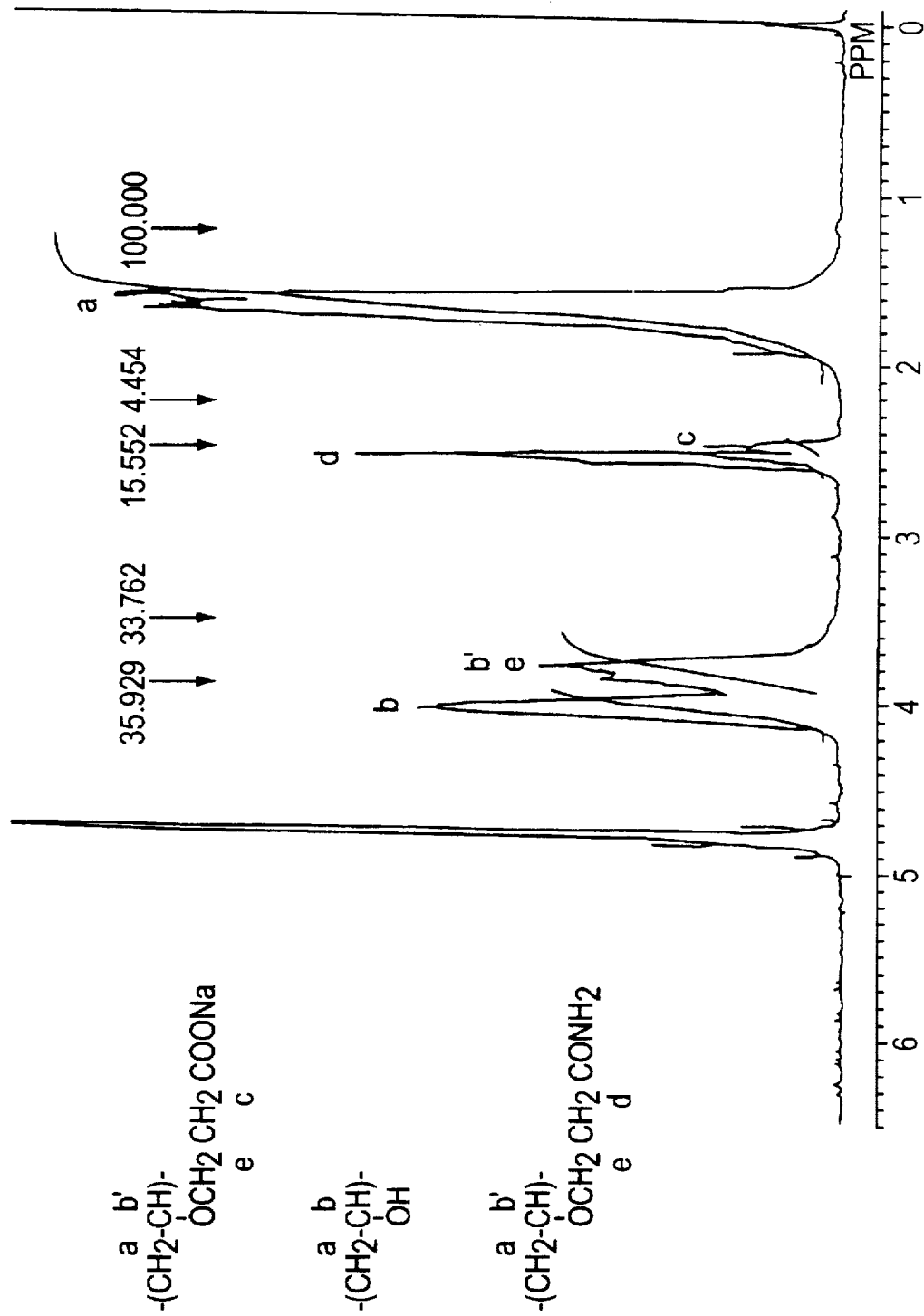
FIG. 5 shows the NMR spectrum of a modified polyvinyl alcohol obtained in Comparative Example 2.
Figure 6:
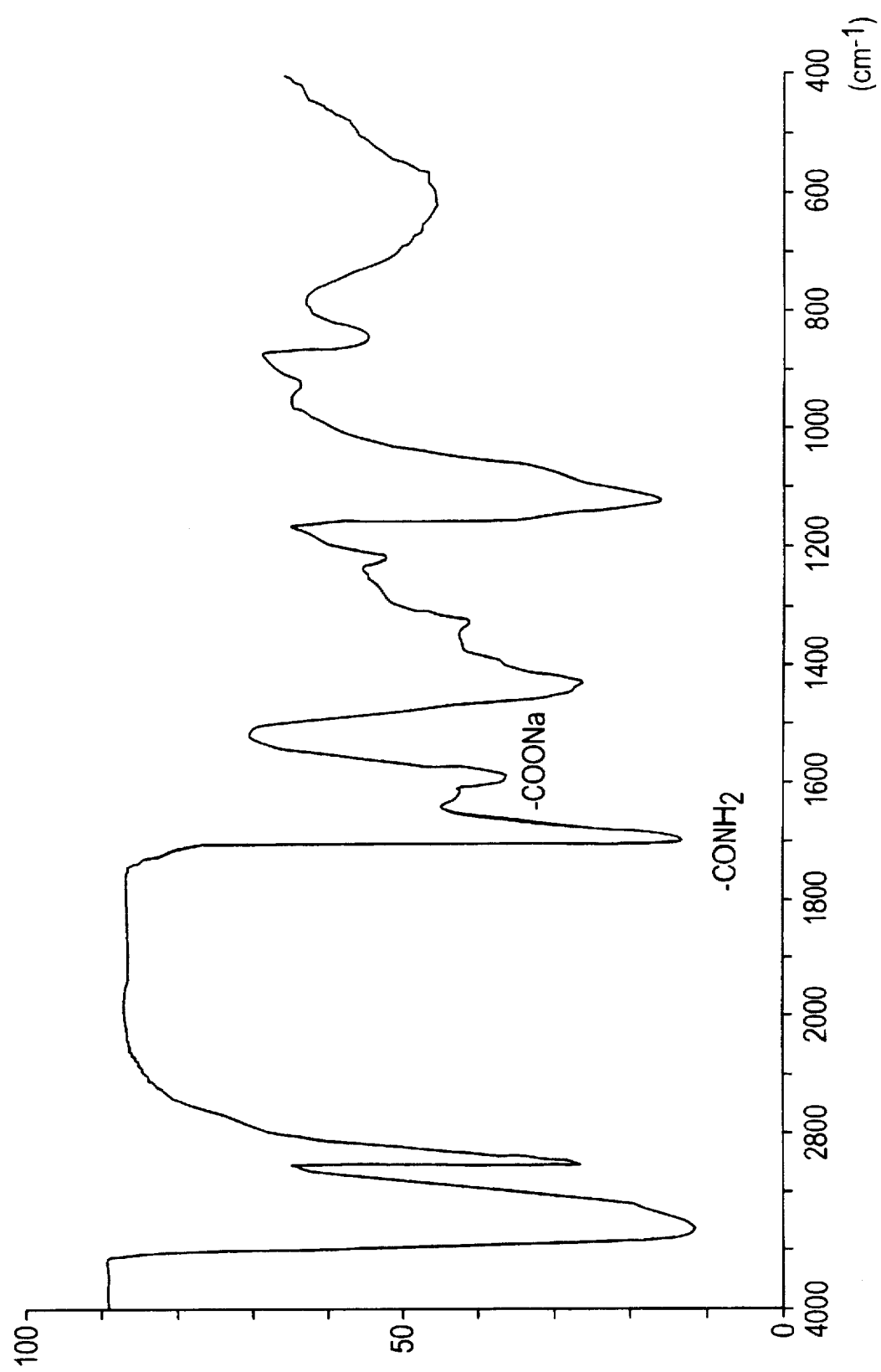
FIG. 6 shows the IR spectrum of a modified polyvinyl alcohol obtained in Comparative Example 2.

When the polymer thus obtained was analyzed using NMR (see FIG. 5), the carboxyethyl group content and the carbamoylethyl group content thereof were 4.5 mol % and 15.6 mol %, respectively. The weight-average molecular weight of the polymer measured using GPC was 120,000. The 4% NaCl aqueous solution containing the polymer at a concentration of 4% by weight had a viscosity of 2.9 mPa·s.

Examples 8 to 14 And Comparative Examples 3 to 6

Bentonite (42 g) was added to 700 ml of water and dispersed therein. Then, 20 g of each of the polymers of Examples 1 to 7, the polymers of Comparative Examples 1 and 2 and low-viscosity CMC was added thereto and uniformly dissolved with stirring. Furthermore, 180 g of NaCl and 21 g of CaCl$_2$ were added and uniformly dissolved. After the mixture was stored overnight, it was stirred again to thereby uniformly dissolve the sample and then adjusted to pH 9.5 to 11.0 with sodium hydroxide. Subsequently, slurry was divided into 2 portions. One portion of the slurry was subjected to the measurement of rheology and then fluid loss. Another portion of the slurry was introduced into a heat- and pressure-resistant container and heated with rolling at 180° C. for 16 hours. Then, it was cooled to room temperature and the rheology and the fluid loss were measured.

The rheology (viscosity) was measured using a Fann VG Meter.

The fluid loss test was performed by filtering 350 ml of the slurry using a device for testing fluid loss reducing performance under elevated pressure of 1 kg/cm$^2$ and then determining the fluid loss after 30 minutes. A smaller fluid loss means the better slurry.

The results are shown in Table 1 below.

TABLE 1

|  | Dispersant | Before heating | | After heating | |
|---|---|---|---|---|---|
|  |  | Fluid loss amount (ml) | Viscosity (mPa·s) | Fluid loss amount (ml) | Viscosity (mPa·s) |
| Example 8 | Polymer of Example 1 | 0.1 | 14.7 | 15 | 12.0 |
| Example 9 | Polymer of Example 2 | 0.1 | 13.9 | 32 | 13.5 |
| Example 10 | Polymer of Example 3 | 0.3 | 13.6 | 30 | 13.6 |
| Example 11 | Polymer of Example 4 | 0.5 | 15.6 | 17 | 13.6 |
| Example 12 | Polymer of Example 5 | 0.7 | 14.0 | 34 | 12.4 |
| Example 13 | Polymer of Example 6 | 0.9 | 10.0 | 37 | 11.0 |
| Example 14 | Polymer of Example 7 | 3.5 | 7.5 | 41 | 6.0 |
| Comparative Example 3 | Polymer of Comparative Example 1 | 4.8 | 10.0 | 150 | 12.5 |
| Comparative Example 4 | Polymer of Comparative Example 2 | 25.0 | 12.0 | 110 | 9.4 |
| Comparative Example 5 | None | 57.0 | 10.0 | 150 | 11.6 |
| Comparative Example 6 | Low-viscosity CMC | 46.0 | 24.0 | 120 | 19.5 |

Examples 15 to 21 And Comparative Examples 7

A dispersion test was performed using aluminum hydroxide powder which was one of inorganic pigments employed in paper manufacturing.

Water (100 g) containing 0.4% by weight, based on aluminum hydroxide, of each of the polymers of Examples 1 to 7 was introduced into a 1 l beaker. Then, 300 g of a fine powder (average grain size: 0.8 μm) of aluminum hydroxide was added thereto under stirring and dispersed therein. Next, it was stirred at a high speed (4,000 rpm) for 3 minutes to thereby facilitate the dispersion. Thus, an aqueous dispersion of a solid concentration of 75% was obtained. The viscosity of this aqueous dispersion was measured immediately after the preparation and after storage at 25° C. for 1 week using a BM type viscometer and compared with the data of sodium polyacrylate (molecular weight: 10,000), thus evaluating the dispersing performance.

The results are shown in Table 2 below.

TABLE 2

|  | Test conditions | | Viscosity of dispersing solution (mPa · s) | |
| --- | --- | --- | --- | --- |
|  | Dispersant | Amount added (wt % per Al(OH)$_3$) | Immediately after preparation | After one week |
| Example 15 | Polymer of Example 1 | 0.4 | 600 | 635 |
| Example 16 | Polymer of Example 2 | 0.4 | 700 | 770 |
| Example 17 | Polymer of Example 3 | 0.4 | 740 | 780 |
| Example 18 | Polymer of Example 4 | 0.4 | 565 | 610 |
| Example 19 | Polymer of Example 5 | 0.4 | 500 | 560 |
| Example 20 | Polymer of Example 6 | 0.4 | 750 | 780 |
| Example 21 | Polymer of Example 7 | 0.4 | 400 | 420 |
| Comparative Example 7 | Sodium polyacrylate | 0.4 | 1,200 | 1,400 |

Examples 22 to 28 And Comparative Example 8

A definite amount of a dispersant (each of the polymers of Examples 1 to 7 and sodium polyacrylate) was added to water and uniformly dissolved therein. Then, light calcium carbonate (manufactured by Maruo Calcium Co., Ltd.) was added thereto to give a concentration of 60% by weight. After stirring with a homomixer for 10 minutes, the viscosity was measured with a BM viscometer at 25° C.

The results are shown in Table 3 below.

TABLE 3

|  |  | Viscosity of dispersing solution (mPa · s) Amount added (wt % per CaCO$_3$) | | |
| --- | --- | --- | --- | --- |
| | Dispersant | 0.2 | 0.3 | 0.4 |
| Example 22 | Polymer of Example 1 | 480 | 430 | 400 |
| Example 23 | Polymer of Example 2 | 520 | 480 | 440 |
| Example 24 | Polymer of Example 3 | 560 | 500 | 470 |
| Example 25 | Polymer of Example 4 | 480 | 440 | 410 |
| Example 26 | Polymer of Example 5 | 460 | 430 | 400 |
| Example 27 | Polymer of Example 6 | 580 | 530 | 490 |
| Example 28 | Polymer of Example 7 | 380 | 330 | 300 |
| Comparative Example 8 | Sodium polyacrylate (MW: 10,000) | 700 | 600 | 500 |

Examples 29 to 35 And Comparative Examples 9

A performance test was carried out using the polymers of Examples 1 to 7 as a dispersant for a powdery insecticide.

A wettable insecticide composition was obtained by mixing 70 g of o,o-dimethyl-s-(N-methylcarbamoylmethyl) dithiophosphate (dimethoate) employed as an insecticide, 13 g of clay and 7 g of white carbon each employed as a carrier, and 10 g of a polymer employed as a dispersant (each of the polymers of Examples 1 to 7), and finely grinding the obtained mixture to 300-mesh or smaller with a ball mill. Then, the wettability, self-dispersibility and suspension stability of each composition were measured and compared with the data of a sodium alkylnaphthalenesulfonate/formalin condensate (molecular weight: 13,000).

The wettability and the self-dispersibility were measured by introducing 100 ml of hard water (100°) to a 100 ml cylinder and gently adding 1 g of the composition. The wettability is expressed in the time required for the submergence of the composition. A composition with a shorter submergence time has the better wettability. The self-dispersibility was determined by evaluating the dispersibility of the composition thrown into water in the following 3 grades.

A: Uniformly dispersed immediately after throwing.

B: Dispersed not immediately after throwing but after sinking in water by ½ or more.

C: Forming a flocculate or an aggregate on the water surface.

"A" means the best self-dispersibility.

The suspension stability was evaluated by determining the ratio of the suspended material in the following manner. First, 1.0 g of the test composition was introduced into a 200 ml cylinder provided with a stopper. Then, 200 ml of hard water (10°) at 20° C. was added thereto, and the composition was dispersed therein with thoroughly stirring. After stirring by rotating 20 times in 30 seconds, the suspension was stored for 5 minutes. Next, a 20 ml portion of the suspension was sampled with a transfer pipet from the center of the cylinder, filtered through a glass filter and dried. The solid matter thus obtained was determined and the ratio of the suspended material was calculated in accordance with the following formula with the use of the solid content and the amount of the test composition sampled. A larger ratio of the suspended material means the higher suspension stability.

Ratio of suspended material (%) =

$$\frac{\text{solid content}}{\text{(quantity of sampling)} \times (20/200)} \times 100.$$

The results are shown in Table 4 below.

TABLE 4

| | Dispersant | Wettability (sec.) | Self-dispersibility | Ratio of suspended amount (%) |
| --- | --- | --- | --- | --- |
| Example 29 | Polymer of Example 1 | 7 | A | 97 |
| Example 30 | Polymer of Example 2 | 8 | A | 95 |
| Example 31 | Polymer of Example 3 | 6 | A | 98 |

TABLE 4-continued

| | Dispersant | Wettability (sec.) | Self-dispersibility | Ratio of suspended amount (%) |
|---|---|---|---|---|
| Example 32 | Polymer of Example 4 | 5 | A | 92 |
| Example 33 | Polymer of Example 5 | 7 | A | 95 |
| Example 34 | Polymer of Example 6 | 8 | A | 94 |
| Example 35 | Polymer of Example 7 | 6 | A | 98 |
| Comparative Example 9 | Na alkylnaphthalene-sulfonate/formalin condensate (MW: 13,000) | 15 | B | 60 |

Example 36

Into a 4 l horizontal blender were added 300 g of powdery polyvinyl alcohol (degree of saponification: 95% or more, degree of polymerization: 1,700) and 180 g of a 30% NaOH aqueous solution, and the mixture was homogenized with stirring at room temperature for 2 hours. Next, 290 g of a 50% acrylamide aqueous solution was added thereto, and the mixture was stirred at 40° C. for 3 hours. Then, 1,100 g of sodium 2-acrylamide-2-methylpropane-3-sulfonate (AMPS-Na) was added thereto, and the resulting mixture was heated to 70° C. and allowed to react with stirring for 3 hours. Subsequently, 60 g of a 50% NaOH aqueous solution was added, and the mixture was hydrolyzed at 70° C. for 3 hours. After isopropyl alcohol was added in a 5-fold amount, a polymer was purified, dehydrated and dried at 105° C.

The colloidal equivalents of the resulting polymer obtained at pH 3 and pH 10 were 1.16 mg eq/g and 2.76 mg eq/g, respectively. The nitrogen content (N) in the polymer determined by the semimicro-Kjeldahl method was 1.72%. Based on these data, the reaction yields were calculated in accordance with the following formulae.

In the following formulae, a and b represent the colloidal equivalents at pH 3 and pH 10, respectively, and N represents the nitrogen content (%) determined by the semimicro-Kjeldahl method.

Na-carboxyethylated degree (mol %) =

$$\frac{44 \times (b-a)}{1000 - (94 \times (b-a) + 158a + 710N/14)} \times 100$$

Na-AMPS degree (mol %) =

$$\frac{44a}{1000 - (94 \times (b-a) + 158a + 710N/14)} \times 100$$

Carbamoylethylated degree (mol %) =

$$\frac{(44/14) \times (10N - 14a)}{1000 - (94 \times (b-a) + 158a + 710N/14)} \times 100$$

The results of the calculation indicated that the Na-carboxyethylated degree, the Na-AMPS degree, and the carbamoylethylated degree were 12.1 mol %, 8.8 mol %, and 0.5 mol %, respectively.

Figure 7:
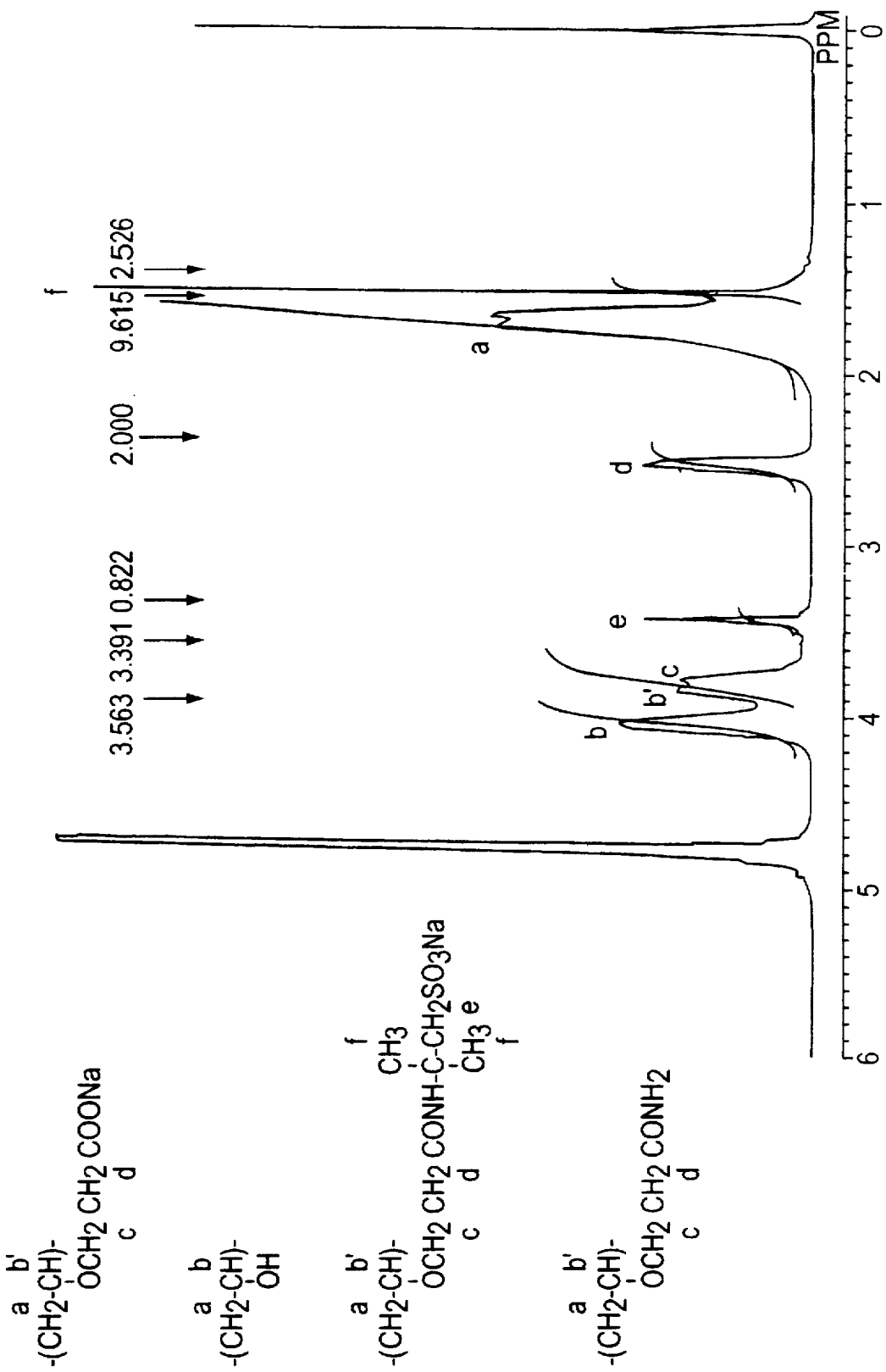
FIG. 7 shows the NMR spectrum of a modified polyvinyl alcohol obtained in Example 36.
Figure 8:
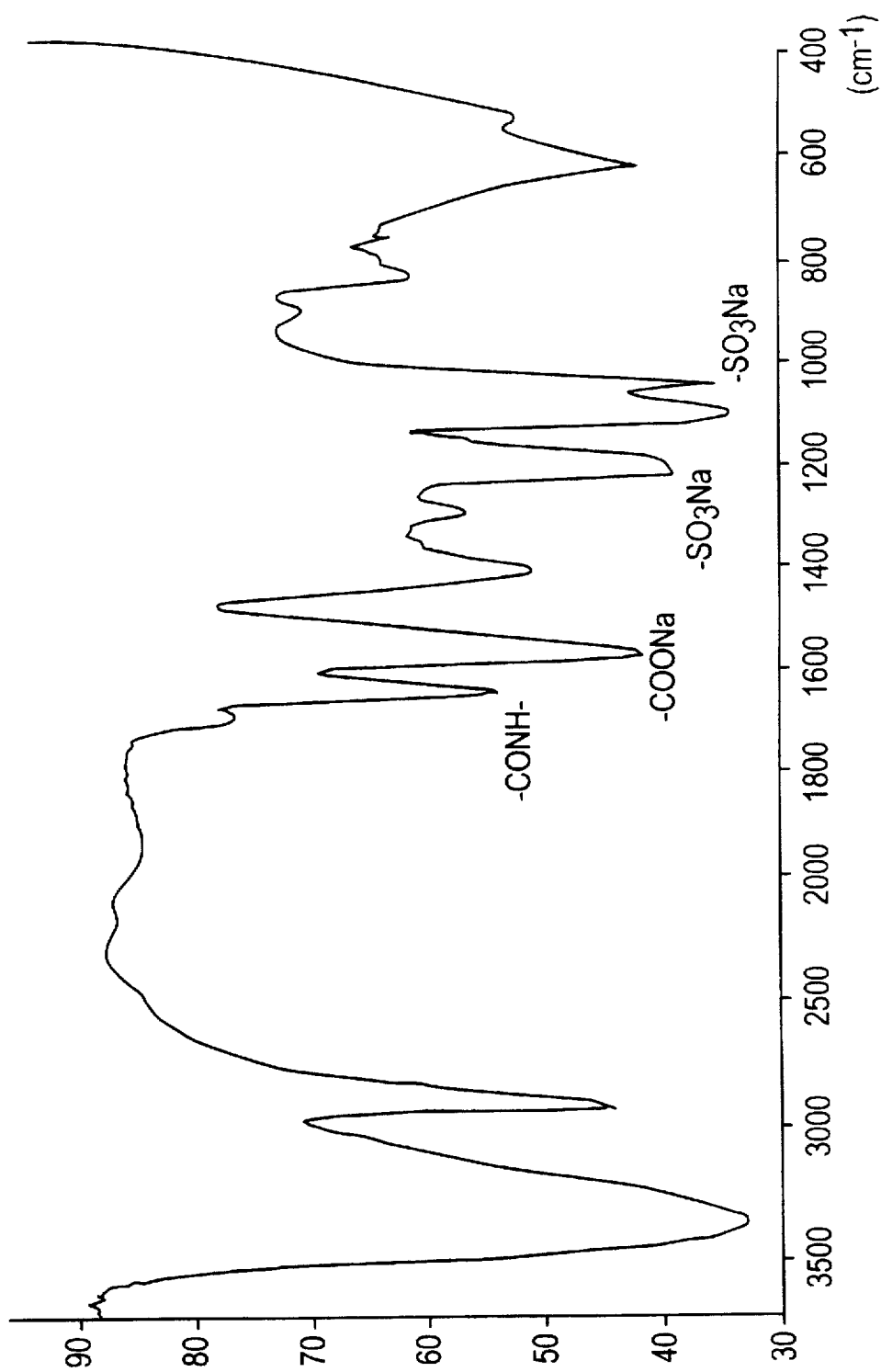
FIG. 8 shows the IR spectrum of a modified polyvinyl alcohol obtained in Example 36.

FIG. 8 shows the IR spectrogram of this polymer. Absorptions assignable to a sulfonate group in the AMPS unit are observed at 1049.0 cm$^{-1}$ and 1220.9 cm$^{-1}$, an absorption assignable to a carboxyl group is observed at 1579.5 cm$^{-1}$, and an absorption assignable to an amide group is observed at 1657.7 cm$^{-1}$. FIG. 7 shows the NMR spectrogram thereof which indicates that the carboxyethylated degree and the AMPS degree are 12.2 mol % and 8.6 mol %, respectively. In the IR analysis, a 0.2% aqueous solution of the polymer was dried at 105° C. to give a film which was then subjected to the measurement. In the NMR analysis, the measurement was carried out in a heavy water solution using an instrument (manufactured by JEOL Ltd.) of 270 MHz in the main frequency. Na-D$_4$ 3-(trimethylsilyl)propionate was used as a standard.

The weight-average molecular weight of the polymer measured using GPC was 120,000. The measurement was carried out at 40° C. using a 0.1N aqueous solution of NaCl as an eluent and 4 columns (TSK gel G2500PW, G3000PW, G4000PW, G5000PW; manufactured by Tosoh Corporation) connected in a series. RI was employed for the detection. A calibration curve was formed using PEG-PEos as molecular weight standards.

The 4% NaCl aqueous solution containing the polymer at a concentration of 4% by weight had a viscosity of 13.0 mPa·s. The viscosity was measured using a rotor No. 1 of a BM type viscometer at 60 rpm at 25° C.

Example 37

Into a 4 l horizontal blender were added 300 g of powdery polyvinyl alcohol (degree of saponification: 95% or more, degree of polymerization: 1,700) and 180 g of a 30% NaOH aqueous solution, and the mixture was homogenized with stirring at room temperature for 2 hours. Next, 480 g of a 50% acrylamide aqueous solution was added thereto, and the mixture was stirred at 40° C. for 3 hours. Then, 600 g of AMPS-Na was added thereto, and the resulting mixture was heated to 70° C. and allowed to react with stirring for 3 hours. Subsequently, 170 g of a 50% NaOH aqueous solution was added, and the mixture was hydrolyzed at 70° C. for 3 hours. After adding isopropyl alcohol in a 5-fold amount, a polymer was purified, dehydrated and dried at 105° C.

The colloidal equivalents of the resulting polymer determined at pH 3 and pH 10 were 0.70 mg eq/g and 2.96 mg eq/g, respectively. The nitrogen content (N) in the polymer determined by the semimicro-Kjeldahl method was 0.99%. The results of the calculation indicated that the Na-carboxyethylated, Na-AMPS, and carbamoylethylated degrees were 16.0 mol %, 5.0 mol %, and 0.0 mol %, respectively.

The weight-average molecular weight of the polymer measured using GPC was 110,000. The 4% NaCl aqueous solution containing the polymer at a concentration of 4% by weight had a viscosity of 12.0 mPa·s.

Example 38

Into a 4 l horizontal blender were added 300 g of powdery polyvinyl alcohol (degree of saponification: 95% or more, degree of polymerization: 500) and 180 g of a 30% NaOH aqueous solution and the mixture was homogenized with stirring at room temperature for 2 hours. Next, 290 g of a 50% acrylamide aqueous solution was added thereto, and the mixture was stirred at 40° C. for 3 hours. Then, 1,100 g of AMPS-Na was added thereto, and the resulting mixture was heated to 70° C. and allowed to react with stirring for 3 hours. Subsequently, 60 g of a 50% NaOH aqueous solution was added, and the mixture was hydrolyzed at 70° C. for 3 hours. After adding isopropyl alcohol in a 5-fold amount, a polymer was purified, dehydrated and dried at 105° C.

The colloidal equivalents of the resulting polymer determined at pH 3 and pH 10 were 1.39 mg eq/g and 2.71 mg eq/g, respectively. The nitrogen content (N) in the polymer determined by the semimicro-Kjeldahl method was 2.03%. The results of the calculation indicated that the Na-carboxyethylated, Na-AMPS, and carbamoylethylated degrees were 10.5 mol %, 11.0 mol %, and 0.5 mol %, respectively.

The weight-average molecular weight of the polymer measured using GPC was 4,000. The 4% NaCl aqueous solution containing the polymer at a concentration of 4% by weight had a viscosity of 4.0 mPa·s.

Example 39

Into a 4 l horizontal blender were added 300 g of powdery polyvinyl alcohol (degree of saponification: 95% or more, degree of polymerization: 2,400) and 180 g of a 30% NaOH aqueous solution, and the mixture was homogenized with stirring at room temperature for 2 hours. Next, 290 g of a 50% acrylamide aqueous solution was added thereto, and the mixture was stirred at 40° C. for 3 hours. Then, 1,100 g of AMPS-Na was added thereto, and the resulting mixture was heated to 70° C. and allowed to react with stirring for 3 hours. Subsequently, 60 g of a 50% NaOH aqueous solution was added, and the mixture was hydrolyzed at 70° C. for 3 hours. After adding isopropyl alcohol in a 5-fold amount, a polymer was purified, dehydrated and dried at 105° C.

The colloidal equivalents of the resulting polymer determined at pH 3 and pH 10 were 1.05 mg eq/g and 2.10 mg eq/g, respectively. The nitrogen content (N) in the polymer determined by the semimicro-Kjeldahl method was 1.57%. The results of the calculation indicated that the Na-carboxyethylated, Na-AMPS, and carbamoylethylated degrees were 7.0 mol %, 7.0 mol %, and 0.5 mol %, respectively.

The weight-average molecular weight of the polymer measured using GPC was 200,000. The 4% NaCl aqueous solution containing the polymer at a concentration of 4% by weight had a viscosity of 24.5 mPa·s.

Examples 40 to 43 And Comparative Examples 10 And 11

The polymers obtained in Examples 36–39 were processed and evaluated in the same manner as in Examples 8–14 above. Comparative Examples 10 and 11 were the same as Comparative Examples 5 and 6 above, respectively.

The results are shown in Table 5 below.

TABLE 5

|  | Dispersant | Before heating | | After heating | |
|---|---|---|---|---|---|
|  |  | Fluid loss amount (ml) | Viscosity (mPa·s) | Fluid loss amount (ml) | Viscosity (mPa·s) |
|---|---|---|---|---|---|
| Example 40 | Polymer of Example 36 | 0.4 | 13.2 | 8.5 | 14.5 |
| Example 41 | Polymer of Example 37 | 0.1 | 14.5 | 24.0 | 12.3 |
| Example 42 | Polymer of Example 38 | 1.0 | 8.6 | 18.5 | 8.7 |
| Example 43 | Polymer of Example 39 | 1.2 | 18.6 | 10.0 | 15.2 |
| Comparative Example 10 | None | 57.0 | 10.0 | 150 | 11.6 |
| Comparative Example 11 | Low-viscosity CMC | 46.0 | 24.0 | 120 | 19.5 |

Examples 44 to 47 And Comparative Examples 12

The polymers obtained in Examples 36–39 were processed and evaluated in the same manner as in Examples 15–21. Comparative Example 12 was the same as Comparative Example 7 above.

The results are shown in Table 6 below.

TABLE 6

|  | Dispersant | Test conditions | Viscosity of dispersing solution (mPa·s) | |
|---|---|---|---|---|
|  |  | Amount added (wt % per Al(OH)$_3$) | Immediately after preparation | After one week |
|---|---|---|---|---|
| Example 44 | Polymer of Example 36 | 0.4 | 430 | 470 |
| Example 45 | Polymer of Example 37 | 0.4 | 420 | 450 |
| Example 46 | Polymer of Example 38 | 0.4 | 400 | 420 |
| Example 47 | Polymer of Example 39 | 0.4 | 440 | 480 |
| Comparative Example 12 | Sodium polyacrylate | 0.4 | 1,200 | 1,400 |

Examples 48 to 51 And Comparative Example 13

The polymers obtained in Examples 36–39 were processed and evaluated in the same manner as in Examples 22–28. Comparative Example 13 was the same as Comparative Example 8.

The results are shown in Table 7 below.

TABLE 7

| | | Viscosity of dispersing solution (mPa·s) Amount added (wt % per CaCO₃) | | |
|---|---|---|---|---|
| | Dispersant | 0.2 | 0.3 | 0.4 |
| Example 48 | Polymer of Example 36 | 370 | 340 | 310 |
| Example 49 | Polymer of Example 37 | 360 | 330 | 300 |
| Example 50 | Polymer of Example 38 | 340 | 300 | 280 |
| Example 51 | Polymer of Example 39 | 380 | 350 | 320 |
| Comparative Example 13 | Sodium polyacrylate (MW: 10,000) | 700 | 600 | 500 |

Examples 52 to 55 And Comparative Example 14

The polymers obtained in Examples 36–39 were processed and evaluated in the same manner as in Examples 29–35. Comparative Example 14 was the same as Comparative Example 9 below.

The results are shown in Table 8.

TABLE 8

| | Dispersant | Wettability (sec.) | Self-dispersibility | Ratio of suspended amount (%) |
|---|---|---|---|---|
| Example 52 | Polymer of Example 36 | 6 | A | 98 |
| Example 53 | Polymer of Example 37 | 5 | A | 98 |
| Example 54 | Polymer of Example 38 | 5 | A | 97 |
| Example 55 | Polymer of Example 39 | 5 | A | 97 |
| Comparative Example 14 | Na alkylnaphthalene-sulfonate/formalin condensate (MW: 13,000) | 15 | B | 60 |

The results in Examples shows that the modified polyvinyl alcohols of the present invention are novel water-soluble polymer compounds which are excellent in dispersing performance and resistant against divalent metal ions and achieve a good effect of fluid loss reducing performance of drilling fluids. Thus, they are useful as a dispersant or a drilling fluid additive.

While the invention has been described in detail and with reference to specific embodiments thereof, it will be apparent to one skilled in the art that various changes and modifications can be made therein without departing from the spirit and scope thereof.

What is claimed is:

1. A modified polyvinyl alcohol, which comprises the following structural units (I) and (II) and has a weight average molecular weight of from 3,000 to 400,000:

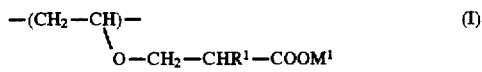

wherein $R^1$ represents H or $CH_3$;

$M^1$ represents H, an alkali metal, ammonium, alkylammonium, or alkanolammonium; and which further comprises the following structural unit (III):

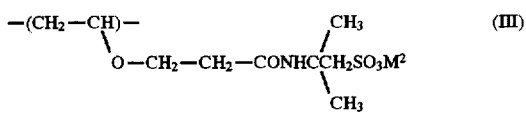

wherein $M^2$ represents H, an alkali metal, ammonium, alkylammonium, or alkanolammonium.

2. The modified polyvinyl alcohol as in claim 1 wherein said modified polyvinyl alcohol further contains the following structural unit (IV):

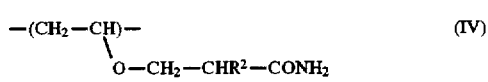

wherein $R^2$ represents H or $CH_3$.

3. The modified polyvinyl alcohol as in claim 1,
wherein the structural unit (I) is contained in an amount of from 0.5 to 30.0 mol %;

the structural unit (II) is contained in an amount of from 50.0 to 99.4 mol %;

the structural unit (III) is contained in an amount of from 0.1 to 20.0 mol %; and the total amount of the structural units (I) and (III) is from 0.6 to 50.0 mol %.

4. The modified polyvinyl alcohol as in claim 2,
wherein the structural unit (I) is contained in an amount of from 0.5 to 30.0 mol %;

the structural unit (II) is contained in an amount of from 50.0 to 99.4 mol %;

the structural unit (III) is contained in an amount of from 0.1 to 20.0 mol %;

the structural unit (IV) is contained in an amount of 5.0 mol % or less; and the total amount of the structural units (I) and (III) is from 0.6 to 50.0 mol %.

5. A dispersant comprising a modified polyvinyl alcohol, which comprises the following structural units (I) and (II) and has a weight average molecular weight of from 3,000 to 400,000:

wherein $R_1$ represents H or $CH_3$;

$M^1$ represents H, an alkali metal, ammonium, alkylammonium, or alkanolammonium; and wherein the modified polyvinyl alcohol further contains the following structural unit (III):

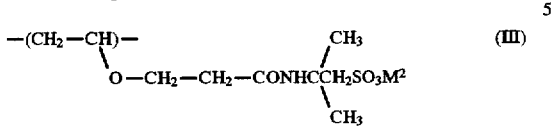

wherein $M^2$ represents H, an alkali metal, ammonium, alkylammonium, or alkanolammonium.

6. A dispersant comprising a modified polyvinyl alcohol, which comprises the following structural units (I) and (II) and has a weight average molecular weight of from 3,000 to 400,000:

wherein $R_1$ represents H or $CH_3$;

$M^1$ represents H, an alkali metal, ammonium, alkylammonium, or alkanolammonium; and wherein said modified polyvinyl alcohol further contains the following structural unit (IV):

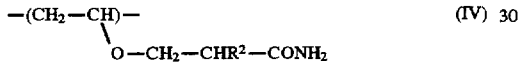

wherein $R^2$ represents H or $CH_3$.

7. A dispersant comprising a modified polyvinyl alcohol, which comprises the following structural units (I) and (II) and has a weight average molecular weight of from 3,000 to 400,000:

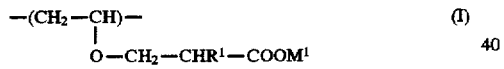

wherein $R_1$ represents H or $CH_3$;

$M^1$ represents H, an alkali metal, ammonium, alkylammonium, or alkanolammonium; and wherein said modified polyvinyl alcohol further contains the following structural units (III) and (IV):

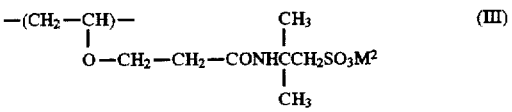

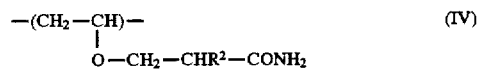

wherein $M^2$ represents H, an alkali metal, ammonium, alkylammonium, or alkanolammonium; and $R^2$ represents H or $CH_3$.

8. The dispersant as in claim 5, wherein the structural unit (I) is contained in an amount of from 0.5 to 30.0 mol %;

the structural unit (II) is contained in an amount of from 50.0 to 99.4 mol %;

the structural unit (III) is contained in an amount of from 0.1 to 20.0 mol %; and the total amount of the structural units (I) and (III) is from 0.6 to 50.0 mol %.

9. The dispersant as in claim 6, wherein the structural unit (I) is contained in an amount of from 3.0 to 45.0 mol %;

the structural unit (II) is contained in an amount of from 55.0 to 97.0 mol %; and the structural unit (IV) is contained in an amount of 10.0 mol % or less.

10. The dispersant as in claim 7, wherein the structural unit (I) is contained in an amount of from 0.5 to 30.0 mol %;

the structural unit (II) is contained in an amount of from 50.0 to 99.4 mol %;

the structural unit (III) is contained in an amount of from 0.1 to 20.0 mol %;

the structural unit (IV) is contained in an amount of 5.0 mol % or less; and the total amount of the structural units (I) and (III) is from 0.6 to 50.0 mol %.

11. The dispersant as in claim 5, wherein the dispersant is a drilling fluid additive.

12. The dispersant as in claim 6, wherein the dispersant is a drilling fluid additive.

13. The dispersant as in claim 7, wherein the dispersant is a drilling fluid additive.

* * * * *

UNITED STATES PATENT AND TRADEMARK OFFICE
CERTIFICATE OF CORRECTION

PATENT NO.: 5,783,628                                       Page 1 of 2

DATED: July 21, 1998

INVENTORS: Akira YADA, Hiroshi NISHIGUCHI, Akira KITADA, Yoshiyuki MORI, and Yoshihiro KAWAMORI It is certified that error appears in the above-indentified patent and that said Letters Patent is hereby corrected as shown below:

| | | |
|---|---|---|
| Column 1 | line 35-36 | delete "indicates" and insert therefor --indicate--; |
| | line 46 | delete "clayey" and insert therefor --clay--. |
| Column 20 | line 12 | delete "contains", insert therefor --comprises--. |
| | line 67 | delete "$R_1$", insert therefor --$R^1$--; |
| Column 21 | line 3 | delete "the", insert therefor --said--; |
| | | delete "contains", insert therefor --comprises--. |
| Column 21 | line 24 | delete "$R_1$", insert therefor --$R^1$--; |
| | line 27 | delete "contains", insert therefor --comprises--. |
| | line 45 | delete "$R_1$", insert therefor --$R^1$--; |
| | line 48 | delete "contains", insert therefor --comprises--. |

UNITED STATES PATENT AND TRADEMARK OFFICE
CERTIFICATE OF CORRECTION

PATENT NO. : 5,783,628
DATED : July 21, 1998
INVENTOR(S) : Akira YADA, et al.

It is certified that error appears in the above-indentified patent and that said Letters Patent is hereby corrected as shown below:

| Column 22 | line 42 | delete "the" | , insert therefor --said--. |
| | line 44 | delete "the" | , insert therefor --said--. |
| | line 46 | delete "the" | , insert therefor --said--. |

Signed and Sealed this

Twenty-eighth Day of September, 1999

Attest:

Q. TODD DICKINSON

Attesting Officer

Acting Commissioner of Patents and Trademarks